Sept. 14, 1926.
V. A. FYNN
DYNAMO ELECTRIC MACHINE
Filed Nov. 9, 1923
1,599,752
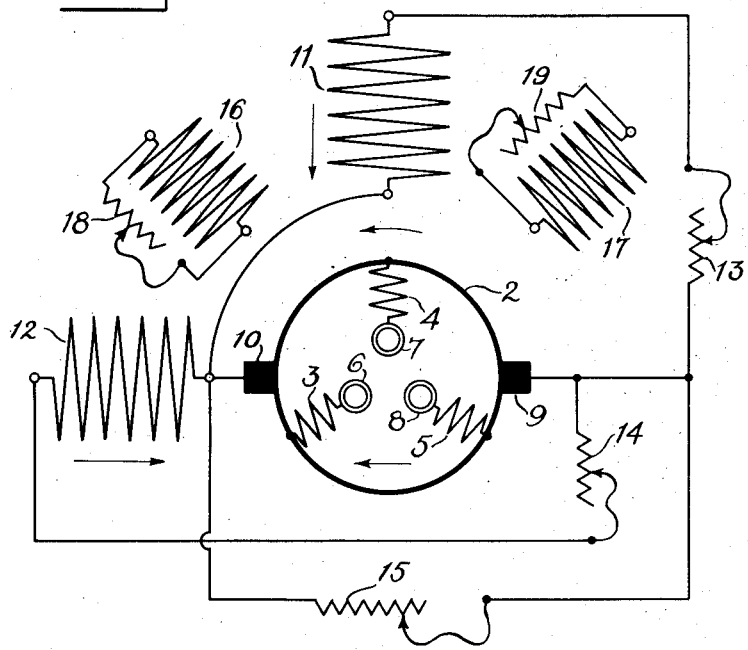
Fig. 1.
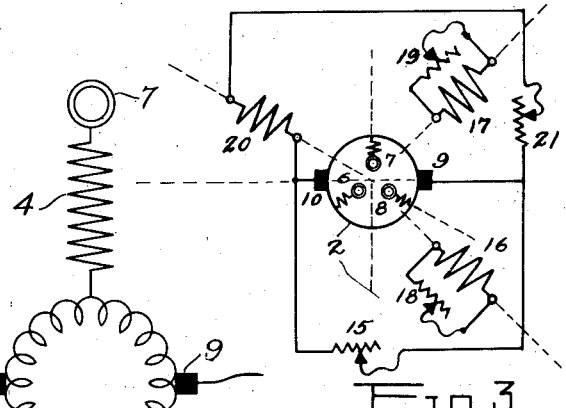
Fig. 2.
Fig. 3.
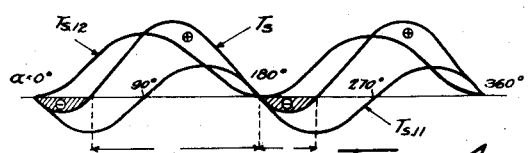
Fig. 4.
Inventor,
VALÈRE ALFRED FYNN
by John H. Bruninga
His Attorney.

Patented Sept. 14, 1926.

1,599,752

UNITED STATES PATENT OFFICE.

VALÈRE ALFRED FYNN, OF ST. LOUIS, MISSOURI.

DYNAMO-ELECTRIC MACHINE.

Application filed November 9, 1923. Serial No. 673,684.

My invention relates more particularly to polyphase motors and generators.

The accompanying diagrammatic drawings show in Figure 1 one embodiment of my invention, Figure 2 shows the preferred form of primary winding, Fig. 3 is a modification of Fig. 1 and Fig. 4 is an explanatory diagram.

Referring to Figure 1 which illustrates a two-pole three-phase motor, both stationary and revolving members are preferably of the stator and rotor type and, therefore, have no defined polar projections. The figure shows a motor with a revolving primary. The rotor carries a commuted winding 2 indicated by a heavy circle, connected to a commutator which is not shown and with which co-operate brushes 9 and 10, shown in the figure as resting directly on the winding 2. The rotor also carries a three-phase star connected winding 3, 4, 5, suitably interconnected with the commuted winding 2 and provided with slip-rings 6, 7, 8 for connection to the supply. Figure 2 illustrates the arrangement of rotor windings more clearly.

The stator of the motor carries two windings 11 and 12, the former located to magnetize the structure along an axis displaced by 90 electrical degrees from the brush axis, the latter adapted to magnetize the structure along an axis coinciding with that of the brushes. These two stator windings are connected in parallel and to the brushes 9 and 10 with the interposition of adjustable resistances 13 and 14. The stator also carries two auxiliary windings 16, 17 in circuit with the adjustable resistances 18, 19 and each displaced by 45 electrical degrees from the windings 11 and 12. In addition to this, an adjustable resistance 15 is connected to the brushes 9 and 10 and is adapted to shunt the commuted winding 2.

Fig. 3 differs from Fig. 1 in that the two parallel connected windings 11, 12 of the latter have been replaced by the single winding 20 located in the axis of the resultant magnetization produced by said two windings.

I operate some or all of the elements of the structure shown in Fig. 1 according to circumstances. For small machines I can set the resistances 13 and 14 to the values they should have in normal operation and dispense with the windings 16 and 17 and with the resistance 15. When the slip-rings are connected to the supply with the stator windings 11 and 12 only in circuit with the brushes co-operating with the primary, the machine will start with a torque sufficient for most purposes, run up to nearly synchronous speed substantially as an asynchronous motor, be pulled into synchronism by the interaction of the stator windings 11, 12 with the commuted winding on the primary, operate at synchronous speed and when overloaded slip out of synchronism and operate as an asychronous motor until its ultimate load limit is reached or until the load is sufficiently reduced to permit it to slip back into synchronous operation.

To improve the starting performance and to relieve the commutator from too heavy a current at starting, I connect the adjustable resistance 15 across the brushes 9, 10 to shunt the commuted winding. As the speed increases I increase this resistance to infinity in one or more steps. Not only does this resistance relieve the brushes 9, 10 from the necessity of carrying an excessive current and thus diminish the tendency to sparking but it provides a non-inductive path for the currents induced in 11 and 12 at starting, thereby increasing the torque per ampere.

Where conditions require it I can start the machine with a resistance in excess of that required in normal operation in the circuits of the windings 11 and 12 and reduce this resistance in one or more steps as the speed increases. The resistance 15 can be used in this case or not, as desired.

For the larger machines or where other circumstances make it advisable to do so, I also make use of the windings 16 and 17 or their equivalent, with or without adjustable resistances. The use of this polyphase arrangement of auxiliary windings further relieves the commutator at starting. The resistance in the circuit of each of these windings can be given a fixed value or it can be reduced in one or more steps as the speed increases. If the use of the resistance 15 is combined with that of the windings 16 and 17, then large machines can be started with a powerful torque with less risk to the commutator and with a higher value of torque per ampere.

The arrangement shown in Fig. 3 can be operated in the same way, the resistance 21 taking the place of the resistances 13 and 14 of Fig. 1, but when operating Fig. 3 I prefer to make use of at least one of the auxiliary windings 16 and 17 at starting so as to have the secondary closed at that time along more than one axis per pole pair.

In normal operation the motor runs at synchronous speed and its power factor curve can be adjusted within very wide limits by means of the resistance 21 or the resistances 13, 14 or one of them or these resistances can be given a definite value which is kept constant throughout the normal operation of the machine.

In order to insure good commutation at starting and under normal running conditions and also avoid an excessive number of turns in the windings 11 and 12 or in 20, I prefer to so design the machine as to produce but a low voltage at the brushes 9, 10. To this end, I either use on the rotor a commuted winding independent of the three-phase working winding 3, 4, 5 or I combine these two windings in the manner more particularly shown in Figure 2, where the commuted winding 2 of but few turns is located in the center of the star connected three-phase winding 3, 4, 5. This commuted winding may be looked upon as a delta connected three-phase winding. In normal operation this winding acts like that of a converter and it carries both alternating and direct current.

Now it is known that under full load conditions the losses in the armature of a single winding three-phase rotary converter are a minimum, being a little more than one half of the loss in that same winding if the latter carried D. C. current only or nothing but the corresponding A. C. current. Bearing this in mind, I prefer when possible to so select the average unidirectional current delivered to the windings 11 and 12 or 20 in normal operation as to make it about equal to the full load three-phase current sent into the slip-rings, thus making the best possible use of the copper and of the winding space in the rotor.

When the direction of rotation is reversed, for instance by transposing two of the primary terminals in the usual manner, the connections between the brushes and the stator winding 11 should also be reversed.

While I do not bind myself to or intend to be limited by any theory of operation, I will outline what I conceive to be the manner in which the machine operates in its various stages and particularly the manner in which the synchronizing torque herein referred to is produced. In a machine with revolving primary, such as that shown in Figure 1, the flux produced by the polyphase windings on said member revolves synchronously in space as long as the primary is at rest. When the primary begins to move, it revolves in a direction opposed to that in which the primary flux rotates and carries said flux with it. This results in a reduction of the space speed of the revolving flux, but the speed of this flux remains synchronous with respect to the primary member. When this member revolves synchronously, the flux in question stands still in space, i. e., with reference to the secondary member. With the primary standing still the revolving flux generates or induces a voltage of line frequency in all stator windings and a voltage of like frequency at the brushes 9, 10. The number of turns in the commuted winding being small relatively to the number of turns in the secondary windings connected to it, the voltages in the secondary windings will be greatly in excess of the commuted winding or brush voltage and will be the deciding factors at starting. The starting will proceed substantially as in an ordinary induction motor, more particularly when the impedance of the secondary circuits is reduced by shunting the commuted winding by means of the non-inductive resistance 15. Because of the great difference in the auxiliary or brush and secondary voltages, this resistance can readily be made of such magnitude as to allow but a little brush current to flow through while carrying an amount of secondary current amply sufficient to produce enough starting torque for all practical purposes.

As the speed of the primary increases, the frequency and the magnitude of the induced secondary voltages diminish and both become zero at synchronism. The brush or auxiliary voltage, on the other hand, merely decreases in frequency, becoming unidirectional at synchronism. The magnitude of this brush voltage is dependent on the magnitude of the primary flux, as modified by the reactions taking place in the motor under starting or operating conditions, and on its speed relative to the commuted winding which speed remains constant. Near synchronism then the brush voltage is of very low frequency, in fact, equal to the so-called slip frequency, but its amplitude is of about normal operating magnitude, whereas the voltage generated by the primary flux in the secondary windings connected to the brushes is very small because of the very small slip or very slow rate at which they are cut by the revolving flux and notwithstanding the larger number of turns in the secondary windings. At this stage the brush or auxiliary voltage is preponderant. The smaller the slip, i. e., the nearer synchronism, the fuller the control of the brush voltage and it is permissible, as a first approximation, to disregard the secondary slip voltage altogether.

Very near synchronism the low periodicity brush voltage sends a corresponding conduced current through each of the secondary windings 11 and 12 and because the periodicity is low each of these currents will be nearly in phase with the brush voltage.

Making the further simplifying assumption that this small phase difference is nil, it will be seen that at the moment the brush voltage is a maximum the ampereturns in 11 and in 12 will also be a maximum. But the brush voltage is a maximum when the axis of the revolving flux is displaced 90 electrical degrees from the brush axis and, therefore, coincides with the axis of 11 and is displaced 90 electrical degrees from the axis of 12. Secondary ampereturns react with the revolving flux to produce torque whenever space and phase relations permit. In this case the ampereturns in the winding 11 are at a maximum when the axis of the primary flux coincides with the axis of 11, hence no torque can result. On the other hand, the ampereturns in the winding 12 are at a maximum when the axis of the flux is displaced 90 electrical degrees from the axis of 12 and all conditions for torque production are at their best, a large, and in fact maximum, torque results. As the flux axis continues to rotate oppositely to the direction of rotation of the primary it becomes displaced from the axis of 11 as well as from that of 12. Now the flux component in line with 12 reacts to produce torque with the ampereturns in 11 and that in line with 11 to produce torque with the ampereturns in 12. During the progress of this movement of the flux axis, the currents in both secondary windings diminish and become zero when the flux axis coincides with the brush axis. A continuation of the movement repeats the process in reverse order, producing a resultant torque of substantially the same direction because both flux and secondary currents are now reversed.

Following the axis of the revolving flux step by step through 360 degrees while bearing in mind the relations set forth in the preceding paragraph, the synchronizing torque produced by the winding 11 as well as that produced by the winding 12 can be easily plotted and the magnitude and configuration of the resultant torque more clearly visualized. For this analysis it is assumed that all fluxes have sine distribution and all voltages and currents vary according to the sine law. The angular displacement $\alpha$ between the brush axis and the axis of the revolving flux is to be counted from the instant when said field axis coincides with the brush axis and is directed from brush 9 to brush 10. The frequency of the brush voltage is equal to the slip frequency, it is zero for $\alpha=0$, a negative maximum for $\alpha=90$, zero for $\alpha=180$ and a positive maximum for $\alpha=270$ degrees. The ampereturns in the windings 11 and 12 vary as the brush voltage. The torque produced by the winding 11 and by the winding 12 is always proportional to the ampereturns in the winding in question and to that component of the revolving flux which is perpendicular to said winding.

For winding 11 the synchronizing or "pull in" torque it produces is zero for $\alpha=0$ and for $\alpha=180$ degrees because there are then no ampereturns in 11 and it is also zero for $\alpha=90$ and for $\alpha=270$ because then the axis of the revolving field is at right angles to the brush axis and coincides with the axis of 11. When $\alpha=45$ or 135 or 225 or 315 degrees, this torque is a maximum being proportional to sine $\alpha \times$ cosine $\alpha$ or to about 70 per cent of the maximum ampereturns in 11 multiplied by about 70 per cent of the maximum value of the revolving flux. When $\alpha=45$ the ampereturns are negative and the active component of the revolving flux is directed from right to left, the torque is negative. When $\alpha=135$ the ampereturns are still negative but the direction of the active component of the revolving flux is reversed, the torque is positive, and so forth. This clearly shows that the torque due to the winding 11 is of double slip frequency as shown by the curve $T_{s'11}$ of Fig. 4.

In the case of winging 12 which is subject to the same brush voltage of slip frequency, the synchronizing torque it produces is zero only when the brush voltage is zero or for $\alpha=0$ and for $\alpha=180$ degrees. It reaches a maximum each time the brush voltage reaches a maximum or for $\alpha=90$ and for $\alpha=270$ degrees. Its maximum value is proportional to sine squared $\alpha$ or to the maximum brush voltage, or the maximum ampereturns it produces in 12, multiplied by the full value of the revolving flux. If the windings 11 and 12 and their circuits are so dimensioned that the ampereturns in the one are equal to the ampereturns in the other, then the maximum value of the synchronizing torque due to 12 is just twice as great as the maximum torque due to the winding 11 because $1 \times 1 = 1$ and $$0.7 \times 0.7 = 0.49.$$

As long as the axis of the revolving flux travels from zero to 180 degrees, its effective component with respect to the winding 12 remains directed from bottom to top of the paper. After the 180 degree position is passed the direction of this effective component is reversed but the direction of the ampereturns in 12 changes at the same instant, with the result that the direction of the synchronizing torque produced by 12 remains the same and positive. This torque is represented by the curve $T_{s'12}$ of Fig. 4 on the assumption that the ampereturns in 12 and in 11 are the same. The curve $T_s$ is merely the geometrical resultant of the other two and represents the resulting synchronizing torque due to Fig. 1 when the ampereturns in 11 and 12 are the same. It is clear that this resultant torque is practically or substantially unidirectional, the amplitude of the negative wave is but some 18 per cent of the amplitude of the positive wave and lasts only about one third as long. The greater the ampereturns in 12 as compared to those in 11 the smaller the negative wave and the shorter the time during which it is present.

The secondary voltage is not zero and the lag of current behind the brush voltage is not nil until synchronism is reached, and for this reason the reactions which bring about the synchronizing torque are not exactly as stated, but for all practical purposes, so far as the magnitude of the synchronizing torque is concerned, the most advantageous position of a winding disposed on the secondary and connected to a commuted winding on the primary is that in which its axis coincides with that of the brushes by means of which said connection is made. Below synchronism the voltage responsible for the current in the secondaries is the vector sum of the brush voltage and of that induced in the secondary being considered, and the current in each secondary lags just a little behind the resultant voltage in its circuit. These factors become more and more important as the speed falls further and further away from the synchronous, but are of very small importance in close proximity to the synchronous speed when the induction motor torque is very small and all reliance must be placed on this synchronizing torque in order to bring the machine into step.

The magnitude of the synchronizing torque for a given magnitude of revolving primary flux depends on the number of ampere turns which the commuted winding voltage can produce in the winding or windings connected to the brushes and located on the secondary, and it is, therefore, advantageous to give one or both of these windings as low a resistance and as many turns as possible. This, of course, also means a large number of unidirectional ampere turns on the secondary in normal operation and the machine should be designed accordingly. Should this large number of ampere turns in normal operation not be desirable for other reasons then the resistance of the circuit or circuits connected to the brushes can be increased for normal operation with the help of external resistances. But many turns in the windings on the secondary leads to very high voltages being induced in these windings at starting. This may lead to accidents to life or to break-down of the insulation and it is, therefore, essential to keep the brush voltage down to a low value by some such means as shown in Figure 2. The desired result as to pull in torque will be achieved just so the number of turns of the winding or windings located on the secondary and connected to the brushes is large with respect to the active turns of the commuted winding and the resistance is low relatively to the brush voltage. It will require less copper to make the resistance of only one winding connected to the brushes very low and provide it with many turns and in that case it is best to select that secondary winding which is most effective in producing the synchronizing torque. Such a winding is 12 of Figure 1.

When running under load and at synchronous speed the unidirectional excitation is in the main supplied by the winding 11, while the winding 12 mainly neutralizes the armature reaction. The winding 12 may be designed to fully neutralize the armature reaction and compensate for the local impedance of the armature at any particular load, at which time the winding 11 alone will furnish the unidirectional excitation. At lighter loads, and if no adjustment is made, part of this excitation will be furnished by the winding 12 and the proportions of these two windings can be readily so chosen that the machine will operate at about unity power factor at full load and with a somewhat leading power factor at fractional loads, which is a very desirable condition.

When the load is increased to a point where the machine falls out of synchronism, the windings 11 and 12 or 20, also the windings 16 and 17 if used, automatically resume their action as closed secondaries of an asynchronous motor and the machine continues to operate as such until its final load limit is reached.

When the invention is applied to a motor with a stationary primary the revolving flux revolves synchronously with respect to it and the secondary revolves in the same direction as this revolving flux. In asynchronous operation, the speed of the secondary is a little short of that of the revolving flux, at synchronism the speed of the secondary is the same as that of the revolving flux. In applying this invention to a stationary primary, the brushes co-operating with the commuted winding on the primary must revolve with the secondary but the operation of the machine will be as here explained for the converse arrangement.

It is to be understood that a synchronous motor is a machine capable of operating at a constant and synchronous speed under varying load conditions and which does so operate. The synchronous motors described in this specification carry unidirectional ampereturns on their secondary and unless the organization of the machine is such as to permit, with changing torque demand, (1) of an angular displacement between the axis of said ampereturns and the axis of the resultant motor magnetization, or (2) of a change in the magnitude of said ampereturns or (3) of said angular displacement and of said change in magnitude, the motor cannot and does not run at a constant and synchronous speed under varying load conditions.

It is further to be understood that by "synchronous torque" is meant a torque exerted by a synchronous motor when in normal operation and therefore when running synchronously under load. By "synchronizing torque" is meant any torque adapted to or capable of bringing up to synchronism a motor capable of operating synchronously under varying load conditions. It is, for instance, known that an ordinary polyphase induction motor is a nonsynchronous machine the torque of which falls off very rapidly as synchronism is approached and actually becomes zero at synchronism. It is also known that a polyphase induction motor can be so modified as to make it capable of operating synchronously under varying load conditions. Any torque which, in a polyphase induction motor adapted to operate synchronously under varying load, will bridge the gap between the induction motor torque of the machine, which becomes zero at synchronism, and its synchronous torque is referred to as a "synchronizing torque".

A synchronous motor is said to be "compounded" when the unidirectional ampereturns on the secondary are smaller at light than at heavy loads. This change in the unidirectional ampereturns with changing load affects the power factor at which the machine operates. The change can be such that the power factor remains practically constant throughout the synchronous load range of the motor, or it can be such that the power factor is a leading one at light loads, that this lead diminishes with increasing load and is converted into a lag near the maximum synchronous torque of the machine. Either of these "compounding characteristics" are popular and right now the last named is probably more in demand.

In Fig. 1, and as previously stated, the brush voltage is a maximum when the primary flux which revolves with respect to the primary is displaced by 90 electrical degrees from the brush axis, concurrently said flux is at right angles to the winding 12. The voltage generated in 12 by said flux and the voltage concurrently appearing at the brushes 9, 10 and due to the same flux are cophasal and the synchronizing torque produced by 12 at that time is a maximum for the reasons stated. The winding 12 being coaxial with the brushes to which it is connected produces a pulsating and strictly unidirectional torque without negative values. As to the winding 11 the voltage generated therein by the primary flux is zero when the axis of said flux is coaxial with that of 11. Concurrently this axis is perpendicular to the brush axis and the brush or auxiliary voltage is at a maximum. The voltage generated in 11 and the auxiliary voltage are in phase quadrature and the synchronizing torque due to 11 is a purely alternating torque of double the slip frequency and having equal positive and negative maxima.

When both windings 11 and 12 are connected to the brushes 9, 10 the resultant synchronizing torque has one strictly unidirectional component due to 12 and one alternating component due to 11, this resultant is not a strictly unidirectional synchronizing torque but can be made substantially unidirectional by proportioning the windings 12 and 11 as set forth in this specification and the best results are obtained when the ampereturns in 12 substantially exceed those in 11. By "substantially unidirectional synchronizing torque" is here meant one in which the positive waves substantially preponderate over the negative ones. Any resultant synchronizing torque in which the maxima of the unidirectional component thereof are more than double the maxima of the alternating component is looked upon as substantially unidirectional for the purposes of this invention. Under these conditions the negative maxima of the actual or resultant synchronizing torque will be about 18 percent of the positive maxima or less, and the positive impulses will last at least three times as long as the negative ones.

Since all motors are capable of operating as generators, it will be clear that this machine will also be able to supply current and when so doing, the windings 11 and 12 of Figure 1 or winding 20 of Fig. 3 will serve to control the terminal voltage. It is obvious that various changes may be made in details without departing from the spirit of this invention; it is, therefore, to be understood that this invention is not to be limited to the specific details shown and described.

Having thus described the invention, what is claimed is:

1. The method of operating a motor which carries variable load at synchronous speed, comprising, producing a primary flux which revolves with respect to the primary, causing the primary flux to generate starting-torque-producing ampereturns in a circuit on the secondary, producing an auxiliary voltage of slip frequency which becomes unidirectional and differs from zero at synchronism, and impressing the auxiliary voltage on the starting-torque-producing circuit on the secondary to produce a substantially unidirectional synchronizing torque.

2. The method of operating a motor which carries variable load at synchronous speed, comprising, producing a primary flux which revolves with respect to the primary, causing the primary flux to generate starting-torque-producing ampereturns in circuits on the secondary which magnetize along displaced axes, producing an auxiliary voltage of slip frequency which becomes unidirectional and differs from zero at synchronism, and impressing the auxiliary voltage on one of the starting-torque-producing circuits on the secondary to produce a substantially unidirectional synchronizing torque and at synchronism a secondary magnetization which increases as the load on the motor increases.

3. The method of operating a motor which carries variable load at synchronous speed, comprising, producing between the stator and rotor near synchronism a substantially unidirectional synchronizing torque and causing this torque to lock the motor in synchronism.

4. The method of operating a motor which carries variable load at synchronous speed, comprising, producing between the stator and rotor near synchronism a substantially unidirectional synchronizing torque causing the torque increase as synchronism is approached and maintaining the torque until synchronism is reached.

5. The method of operating a motor which carries variable load at synchronous speed, comprising, starting the motor by producing between the stator and the rotor an induction motor torque which decreases as synchronism is approached and synchronizing the motor by producing a substantially unidirectional torque which increases until synchronism is reached.

6. The method of operating a motor which carries variable load at synchronous speed, comprising, starting the motor by producing between the stator and the rotor an induction motor torque which decreases as synchronism is approached and synchronizing the motor by producing a substantially unidirectional torque which increases as synchronism is approached, and utilizing a part of the synchronizing torque as synchronous torque in synchronous operation.

7. The method of operating a motor which carries variable load at synchronous speed, comprising, producing a primary flux which revolves with respect to the primary, causing the primary flux to generate starting-torque-producing ampereturns in circuits on the secondary which magnetize along displaced axes and an auxiliary voltage of slip frequency which becomes unidirectional and differs from zero at synchronism, and impressing the auxiliary voltage on one of the starting-torque-producing circuits on the secondary to produce synchronizing-torque-producing alternating ampereturns which reach their maximum when the axis of the primary flux is displaced from their axis.

8. In a polyphase motor which carries variable load at synchronous speed, a primary and a secondary without defined polar projections, a commuted and another winding on the primary, said other winding being adapted for connection to the supply, brushes carried by the secondary and cooperating with the commuted winding on the primary to make available an auxiliary voltage, and two displaced windings located on the secondary and both connected to the same brushes, the brush axis coinciding with the axis of one of the windings on the secondary and the circuit of that secondary winding being dimensioned to produce more auxiliary-voltage-ampereturns than the other secondary winding.

9. In a polyphase motor which carries variable load at synchronous speed, a primary and a secondary without defined polar projections, a commuted and a polyphase winding on the primary adapted to be connected to the supply, brushes carried by the secondary and cooperating with the commuted winding on the primary, two displaced windings on the secondary, the axis of one of said windings coinciding with the brush axis and both of them being connected to the same brushes, and an additional closed winding on the secondary member, the axis of this additional winding being displaced from the axes of the other windings on the secondary.

10. In a polyphase motor which carries variable load at synchronous speed, a primary and a secondary without defined polar projections, a commuted and a polyphase winding on the primary member, the polyphase winding being adapted for connection to the supply, one set of brushes cooperating with the commuted winding to make available an auxiliary voltage, circuits on the secondary adapted to magnetize along displaced axes and to start the machine as an induction motor, and means adapted to produce a substantially unidirectional synchronizing torque and at synchronism a secondary unidirectional magnetization which increases when the motor load increases, said means including one of the circuits on the secondary for producing a magnetization dependent on the auxiliary voltage and the brushes cooperating with the commuted winding, said brushes being located along an axis displaced from the perpendicular to the axis of said last named magnetization.

11. A motor which carries variable load at synchronous speed, having a primary member carrying a winding adapted to produce a primary flux which revolves with respect to the primary, a secondary member and a circuit thereon in inductive relation to the primary flux, a source of auxiliary voltage of slip frequency which becomes unidirectional and differs from zero at synchronism, and means adapted to produce near synchronism and in cooperation with said primary flux a substantially unidirectional synchronizing torque which is maintained until synchronism is reached, said means including the circuit on the secondary and said source for setting up at sub-synchronous speeds secondary ampereturns of about the same phase as the ampereturns generated in said secondary circuit by the primary flux.

12. A motor which carries variable load at synchronous speed, having a primary member carrying a winding adapted to produce a primary flux which revolves with respect to the primary, a secondary member and circuits thereon adapted to magnetize the secondary along displaced axes and to start the machine as an induction motor, a source of auxiliary voltage of slip frequency which becomes unidirectional and differs from zero at synchronism, and means adapted to produce near synchronism and in cooperation with said primary flux a substantially unidirectional synchronizing torque which is maintained until synchronism is reached, said means including one of the circuits on the secondary and said source for setting up at sub-synchronous speeds auxiliary secondary ampereturns of about the same phase as the ampereturns generated in the same secondary circuit by the primary flux.

13. A motor which carries variable load at synchronous speed comprising, a primary member having a winding provided with a commutator and brushes, and a secondary member having a winding excited by the unidirectional commuted current, said secondary winding being adapted to have induced therein torque-producing-currents at starting, and a shunt path adapted to relieve the commutator circuit of at least part of the secondary current at starting.

In testimony whereof I affix my signature this 5th day of November, 1923.

VALÈRE ALFRED FYNN.

Certificate of Correction.

It is hereby certified that in Letters Patent No. 1,599,752, granted September 14, 1926, upon the application of Valère Alfred Fynn, of St. Louis, Missouri, for an improvement in "Dynamo-Electric Machines," an error appears in the printed specification requiring correction as follows: Page 6, line 26, claim 4, after the word "torque" insert the word *to;* and that the said Letters Patent should be read with this correction therein that the same may conform to the record of the case in the Patent Office.

Signed and sealed this 26th day of October, A. D. 1926.

[SEAL.]
WM. A. KINNAN,
*Acting Commissioner of Patents.*